United States Patent
Khoshnevisan et al.

(10) Patent No.: US 11,265,122 B2
(45) Date of Patent: Mar. 1, 2022

(54) MULTI-TRANSMIT RECEIVE POINT DEMODULATION REFERENCE SIGNAL PORT IDENTIFICATION

(71) Applicant: QUALCOMM Incorporated, San Diego, CA (US)

(72) Inventors: Mostafa Khoshnevisan, San Diego, CA (US); Alexandros Manolakos, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 16/588,781

(22) Filed: Sep. 30, 2019

(65) Prior Publication Data

US 2020/0112411 A1      Apr. 9, 2020

(30) Foreign Application Priority Data

Oct. 3, 2018   (GR) .............................. 20180100454

(51) Int. Cl.
| | |
|---|---|
| *H04L 5/00* | (2006.01) |
| *H04W 72/04* | (2009.01) |
| *H04J 13/16* | (2011.01) |
| *H04L 25/02* | (2006.01) |

(52) U.S. Cl.
CPC ............ *H04L 5/0048* (2013.01); *H04J 13/16* (2013.01); *H04L 25/0204* (2013.01); *H04W 72/042* (2013.01); *H04W 72/0466* (2013.01)

(58) Field of Classification Search
CPC . H04L 5/0048; H04L 25/0202; H04L 5/0023; H04L 5/0035; H04L 5/0051; H04L 5/0053; H04L 25/0204; H04J 3/16; H04W 72/042
See application file for complete search history.

(56) References Cited

FOREIGN PATENT DOCUMENTS

| WO | WO 2018059362 A1 | * | 4/2018 | ............... H04L 5/00 |
| WO | WO-2018059362 A1 | * | 4/2018 | ........... H04L 5/0091 |

OTHER PUBLICATIONS

ZTE, R1-1810220:"Enhancements on multi-TRP/Panel Transmission", Sep. 29, 2018 published, pp. 3, 4. (Year: 2018).*

(Continued)

*Primary Examiner* — Huy D Vu
*Assistant Examiner* — Robert Ma
(74) *Attorney, Agent, or Firm* — Qualcomm Incorporated

(57) ABSTRACT

Various aspects of the present disclosure generally relate to wireless communication. In some aspects, a user equipment may receive a downlink control information (DCI) that includes a transmission configuration indication (TCI) state, may determine that the TCI state specifies a quantity of two or more quasi-co-location (QCL) relationships may identify, based at least in part on the determining, a multi-transmit receive point (TRP) demodulation reference signal (DMRS) port group configuration included in a multi-TRP DMRS port group configuration data structure, and may perform, based at least in part on the multi-TRP DMRS port group configuration, a channel estimation for a downlink of a wireless communication link between the UE and the TR. Numerous other aspects are provided.

30 Claims, 11 Drawing Sheets

(56) References Cited

OTHER PUBLICATIONS

Techplayon.com, "5G NR Reference Signals (DMRS, PTRS, SRS and CSI-RS)", Sep. 26, 2018 published, p. 1 (Year: 2018).*
3GPP TS 38.212 v15.2.0 (Jun. 2018), 3rd Generation Partnership Project; Technical Specification Group Radio Access Network; NR; Multiplexing and channel coding (Release 15). pp. 91-94. (Year: 2018).*
Vivo, R1-1810402:"Discussion on Enhancements on Multi-TRP/Panel Transmission", Sep. 29, 2018 published, p. 2. (Year: 2018).*
"3rd Generation Partnership Project; Technical Specification Group Radio Access Network; NR; Multiplexing and Channel Coding (Release 15)", 3GPP Standard; Technical Specification; 3GPP TS 38.212, 3rd Generation Partnership Project (3GPP), Mobile Competence Centre; 650, Route Des Lucioles; F-06921 Sophia-Antipolis Cedex; France, vol. RAN WG1, No. V15.2.0, Jun. 29, 2018, XP051474489, [retrieved on Jun. 29, 2018], tables 7.3.1.2.2-1/2/3/4, pp. 1-98.
International Search Report and Written Opinion—PCT/US2019/054056—ISA/EPO—dated Jan. 17, 2020.
ZTE: "Enhancements on Multi-TRP/Panel Transmission", 3GPP Draft; R1-1810220 Enhancements on Multi-TRP/Panel Transmission, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018 Sep. 29, 2018, XP051517636, Retrieved from the Internet: URL:http://www.3gpp.org/ftp/tsg%5Fran/WG1%5FRL1/TSGR1%5F94b/Docs/R1%2D1810220%2Ezip [retrieved on Sep. 29, 2018], sections 1, 2.1, 2.2.1, 2.2.3, 9 pages.

* cited by examiner

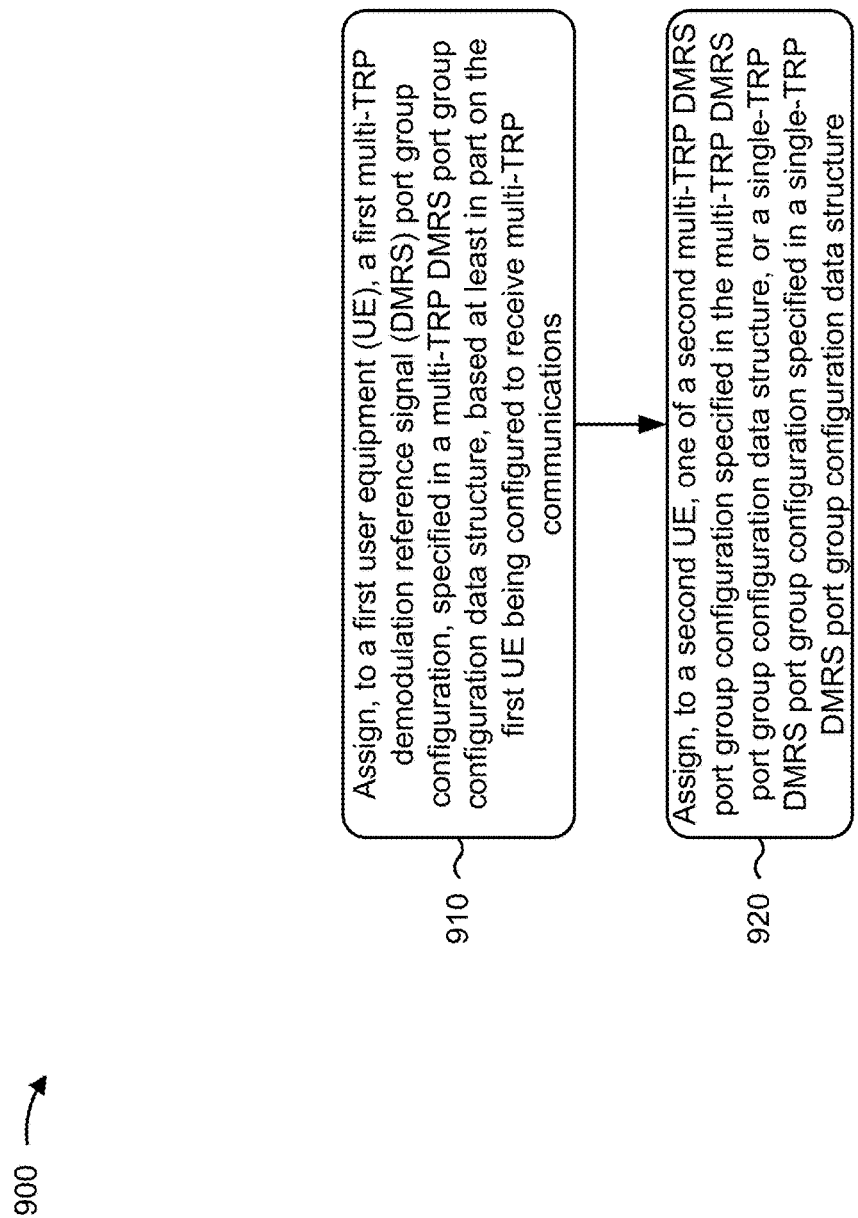

US 11,265,122 B2

MULTI-TRANSMIT RECEIVE POINT DEMODULATION REFERENCE SIGNAL PORT IDENTIFICATION

RELATED APPLICATION

This application claims priority to Greek Patent Application No. 20180100454, filed on Oct. 3, 2018, entitled "MULTI-TRANSMIT RECEIVE POINT DEMODULATION REFERENCE SIGNAL PORT IDENTIFICATION," which is hereby expressly incorporated by reference herein.

FIELD OF THE DISCLOSURE

Aspects of the present disclosure generally relate to wireless communication, and to techniques and apparatuses for multi-transmit receive point demodulation reference signal port identification.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method for wireless communication, performed by a user equipment (UE), may include receiving a DCI that includes a TCI state; determining that the TCI state specifies a quantity of two or more quasi-co-location (QCL) relationships; identifying, based at least in part on the determining, a multi-transmit receive point (TRP) demodulation reference signal (DMRS) port group configuration included in a multi-TRP DMRS port group configuration data structure; and performing, based at least in part on the multi-TRP DMRS port group configuration, a channel estimation for a downlink of a wireless communication link between the UE and the TRP.

In some aspects, a user equipment for wireless communication may include a memory and one or more processors communicatively coupled to the memory. The memory and the one or more processors may be configured to receive a DCI that includes a TCI state; determine that the TCI state specifies a quantity of two or more QCL relationships; identify, based at least in part on the determining, a multi-TRP DMRS port group configuration included in a multi-TRP DMRS port group configuration data structure; and perform, based at least in part on the multi-TRP DMRS port group configuration, a channel estimation for a downlink of a wireless communication link between the UE and the TRP.

In some aspects, a non-transitory computer-readable medium may store one or more instructions for wireless communication. The one or more instructions, when executed by one or more processors of a UE, may cause the one or more processors to receive a DCI that includes a TCI state; determine that the TCI state specifies a quantity of two or more QCL relationships; identify, based at least in part on the determining, a multi-TRP DMRS port group configuration included in a multi-TRP DMRS port group configuration data structure; and perform, based at least in part on the multi-TRP DMRS port group configuration, a channel estimation for a downlink of a wireless communication link between the UE and the TRP.

In some aspects, an apparatus for wireless communication may include means for receiving a DCI that includes a TCI state; means for determining that the TCI state specifies a quantity of two or more QCL relationships; means for identifying, based at least in part on the determining, a multi-TRP DMRS port group configuration included in a multi-TRP DMRS port group configuration data structure; and means for perform, based at least in part on the multi-TRP DMRS port group configuration, a channel estimation for a downlink of a wireless communication link between the apparatus and the TRP.

In some aspects, a method for wireless communication, performed by a TRP, may include assigning, to a first UE, a first multi-TRP DMRS port group configuration, specified in a multi-TRP DMRS port group configuration data structure, based at least in part on the first UE being configured to receive multi-TRP communications. The method may include assigning, to a second UE, one of a second multi-TRP DMRS port group configuration specified in the multi-TRP DMRS port group configuration data structure, or a single-TRP DMRS port group configuration specified in a single-TRP DMRS port group configuration data structure.

In some aspects, a TRP for wireless communication may include a memory and one or more processors communicatively coupled to the memory. The memory and the one or more processors may be configured to assign, to a first UE, a first multi-TRP DMRS port group configuration, specified in a multi-TRP DMRS port group configuration data structure, based at least in part on the first UE being configured to receive multi-TRP communications. The memory and the one or more processors may be configured to assign, to a second UE, one of a second multi-TRP DMRS port group configuration specified in the multi-TRP DMRS port group configuration data structure, or a single-TRP DMRS port group configuration specified in a single-TRP DMRS port group configuration data structure.

In some aspects, a non-transitory computer-readable medium may store one or more instructions for wireless communication. The one or more instructions, when executed by one or more processors of a TRP, may cause the one or more processors to assign, to a first UE, a first multi-TRP DMRS port group configuration, specified in a multi-TRP DMRS port group configuration data structure, based at least in part on the first UE being configured to receive multi-TRP communications. The one or more instructions, when executed by one or more processors of a user equipment, may cause the one or more processors to assign, to a second UE, one of a second multi-TRP DMRS port group configuration specified in the multi-TRP DMRS port group configuration data structure, or a single-TRP DMRS port group configuration specified in a single-TRP DMRS port group configuration data structure.

In some aspects, an apparatus for wireless communication may include means for assigning, to a first UE, a first multi-TRP DMRS port group configuration, specified in a multi-TRP DMRS port group configuration data structure, based at least in part on the first UE being configured to receive multi-TRP communications. The apparatus may include means for assigning, to a second UE, one of a second multi-TRP DMRS port group configuration specified in the multi-TRP DMRS port group configuration data structure, or a single-TRP DMRS port group configuration specified in a single-TRP DMRS port group configuration data structure.

Aspects generally include a method, apparatus, system, computer program product, non-transitory computer-readable medium, user equipment, base station, transmit receive point, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a TRP, in accordance with various aspects of the present disclosure.

DETAILED DESCRIPTION

Figure 1:
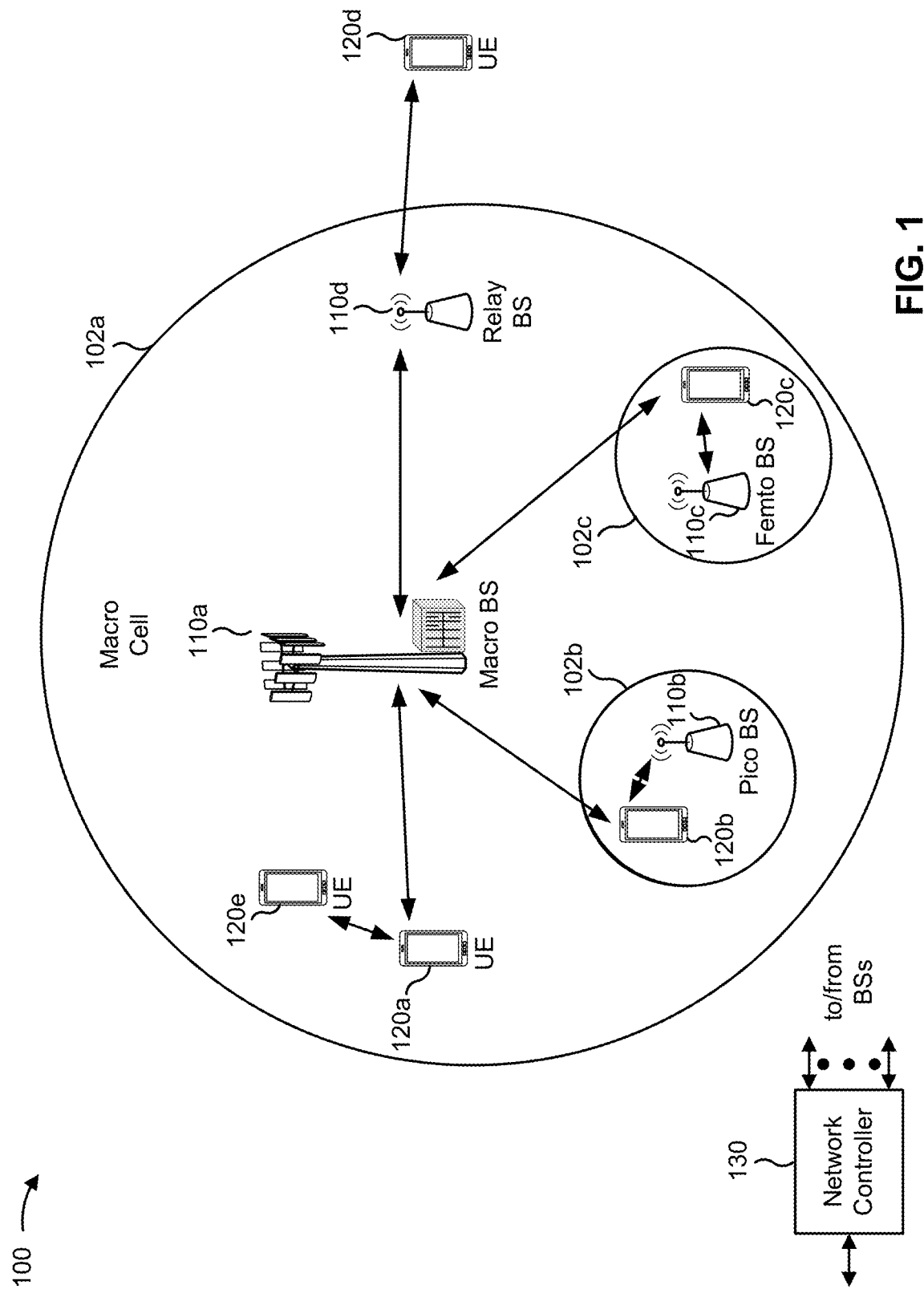
FIG. 1 is a block diagram conceptually illustrating an example of a wireless communication network, in accordance with various aspects of the present disclosure.

In a wireless network, a user equipment (UE) may perform a channel estimation of one or more properties of a downlink (e.g., signal quality, signal strength, and/or the like), between the UE and a transmit receive point (TRP), based at least in part on one or more reference signals transmitted by the TRP to the UE, such as a demodulation reference signal (DMRS), a phase tracking reference signal (PTRS), and/or the like. In some cases, the TRP may provide, to the UE, information identifying the location of the one or more reference signals. For example, for a DMRS transmission, the TRP may transmit, to the UE, information identifying a DMRS port (which may also be referred to as an antenna port), associated with the DMRS transmission, which may specify a resource configuration for a downlink slot in which the DMRS is transmitted. In this way, the UE may use the information identifying the DMRS port to identify the one or more resource elements that carry the DMRS so that the UE may decode the DMRS and perform the channel estimation.

In some cases, the UE may be communicatively connected to a plurality of TRPs (referred to as multi-TRP) and may transmit communications to, and/or receive communications from, the plurality of TRPs. In some cases, the available DMRS port groups available for channel estimation may not support multi-TRP configurations. For example, the available DMRS port groups available for channel estimation may not allow a plurality of DMRS port groups, to be assigned to a UE, that respectively include DMRS port groups from different code division multiplexing (CDM) groups (e.g., a first DMRS port group, associated with a first TRP communicatively connected with the UE, may include one or more DMRS ports that are included in the same CDM group as one or more DMRS ports included in a second DMRS port group associated with a second TRP communicatively connected with the UE).

Some aspects described herein provide techniques and apparatuses for multi-TRP DMRS port identification. In some aspects, a TRP may transmit, to a UE, a downlink control information (DCI) communication. The DCI communication may include a transmission configuration indication (TCI) state that specifies one of a first quantity of quasi-co-location (QCL) relationships or a second quantity of QCL relationships. Based at least in part on whether the TCI state indicates the first quantity of QCL relationships or the second quantity of QCL relationships, the UE may identify a multi-TRP DMRS port group configuration included in a multi-TRP DMRS port group configuration data structure or a single-TRP DMRS port group configuration included in a single-TRP DMRS port group configuration data structure. In this way, the multi-TRP DRMS port group configuration data structure may include a quantity of DMRS port groups that are capable of supporting multi-TRP in a wireless network, which allows the UE (and other UEs in the wireless network) to perform channel estimation, based at least in part on a DMRS, in a multi-TRP configuration. In this way, the UE is capable of performing channel estimation in a multi-TRP wireless network, which was not previously capable without the multi-TRP DMRS port group configuration data structure, which allows the UEs and the TRPs in the multi-TRP wireless network to optimize downlink parameters, which in turn improves throughput in the wireless network, reduces downlink transmission errors, and conserves wireless network resources that would have otherwise been consumed on retransmitting downlink communications due to downlink transmission errors and/or dropped downlink communications.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used. In some aspects, a BS may communicate with a UE to transmit one or more reference signals. The UE may perform various channel estimations based at least in part on the one or more reference signals received from the BS. In some aspects, UE may communicate with the BS to transmit a channel estimation report, which may include information identifying one or more channel measurements. In some aspects, the BS and the UE may communicate for multi-transmit receive point demodulation reference signal port identification. For example, the BS may transmit, to the UE, a downlink control information communication, which may include information identifying one or more demodulation reference signal ports for channel estimation.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
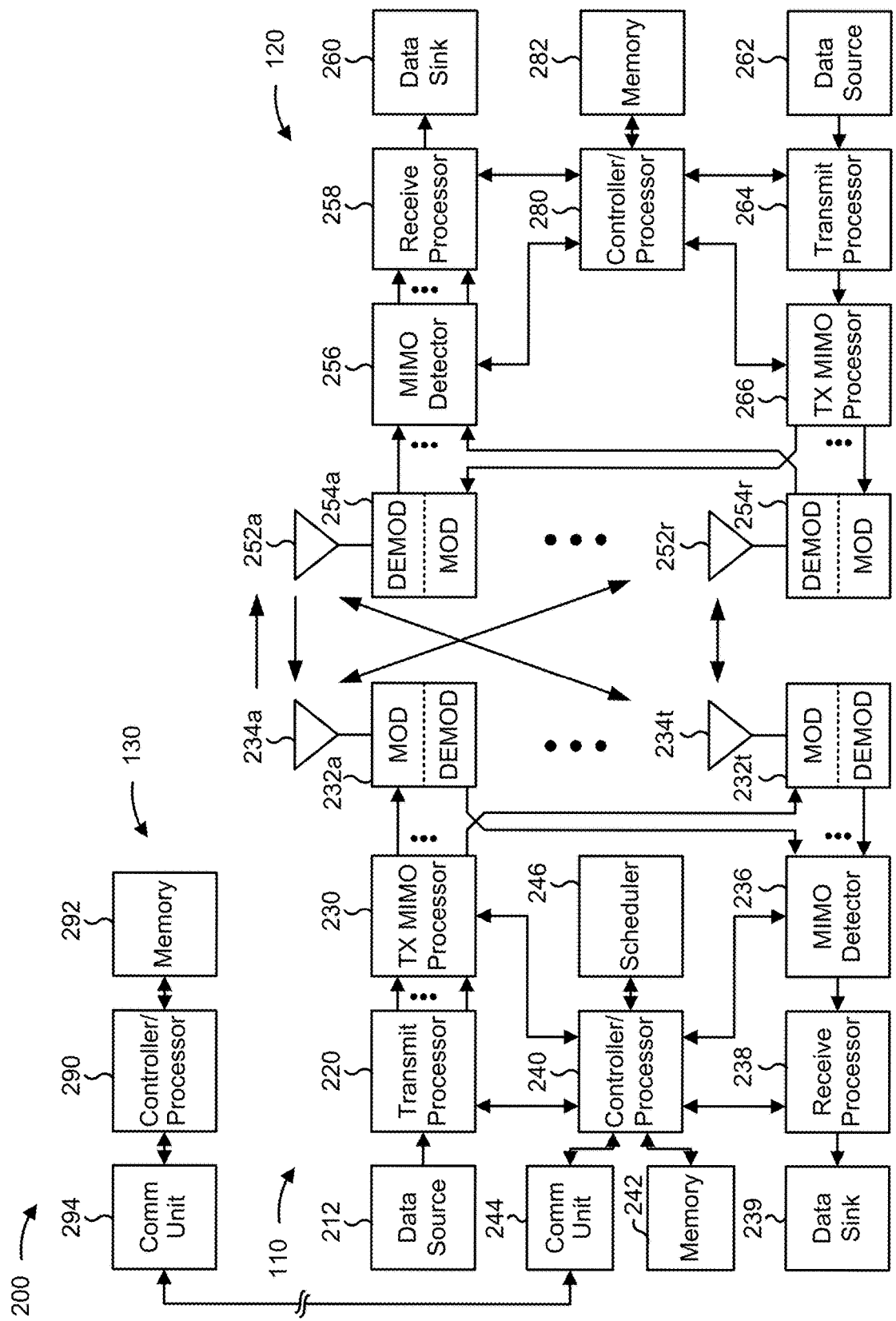
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with multi-transmit receive point demodulation reference signal port identification, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

Figure 8:
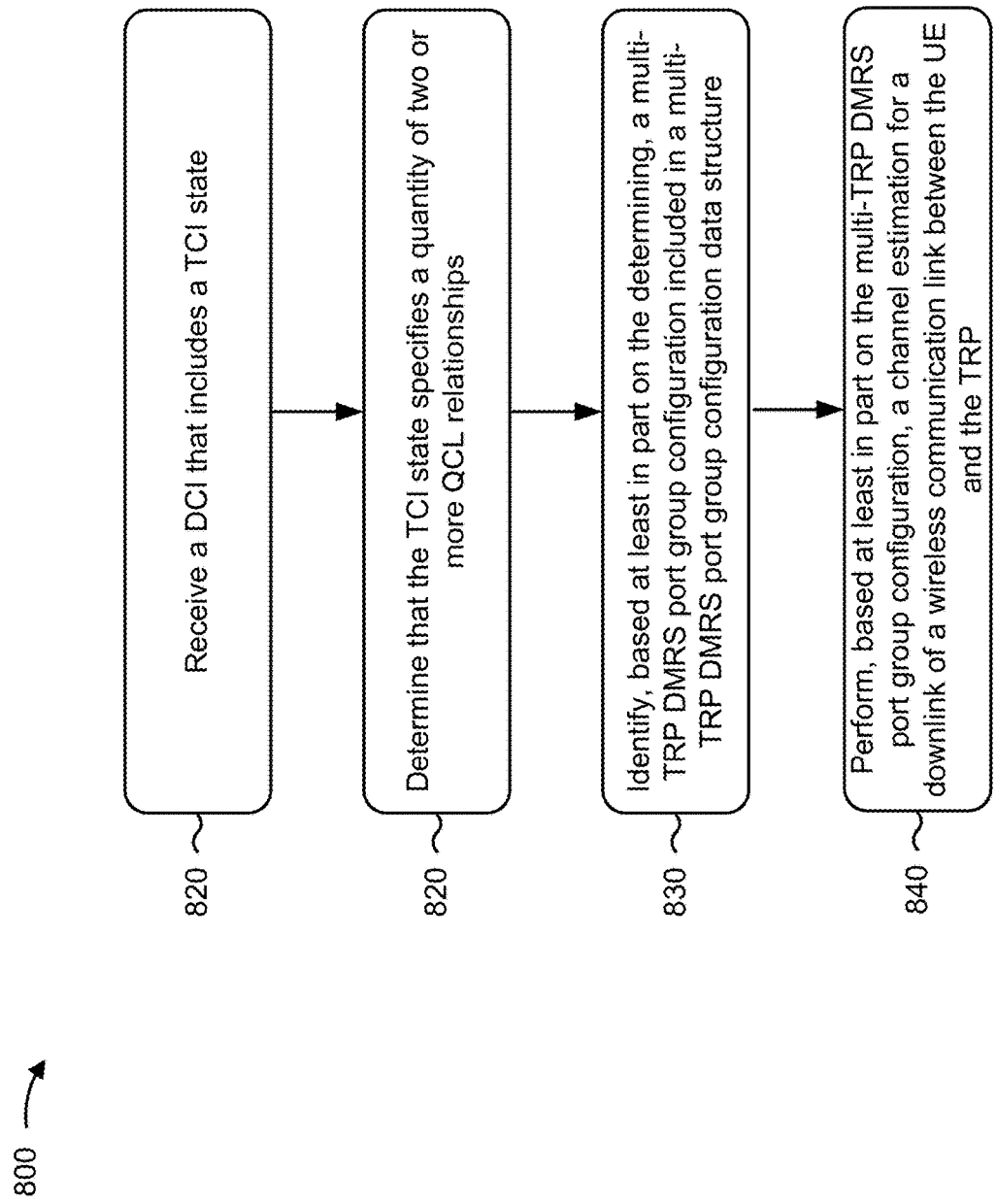
FIG. 8 is a diagram illustrating an example process performed, for example, by a UE, in accordance with various aspects of the present disclosure.

The stored program codes, when executed by controller/processor 280 and/or other processors and modules at UE 120, may cause the UE 120 to perform operations described with respect to process 800 of FIG. 8 and/or other processes as described herein. The stored program codes, when executed by controller/processor 240 and/or other processors and modules at base station 110, may cause the base station 110 to perform operations described with respect to process 900 of FIG. 9 and/or other processes as described herein. A scheduler 246 may schedule UEs for data transmission on the downlink and/or uplink.

In some aspects, UE 120 may include means for receiving a DCI that includes a TCI state, means for determining that the TCI state specifies a quantity of two or more quasi-co-location (QCL) relationships, means for identifying, based at least in part on the determining, a multi-transmit receive point (TRP) demodulation reference signal (DMRS) port group configuration included in a multi-TRP DMRS port group configuration data structure, means for performing, based at least in part on the multi-TRP DMRS port group configuration, a channel estimation for a downlink of a wireless communication link between the UE and the TRP, and/or the like. In some aspects, such means may include one or more components of UE 120 described in connection with FIG. 2.

In some aspects, base station 110 may include means for assigning, to a first user equipment (UE), a first multi-TRP demodulation reference signal (DMRS) port group configuration, specified in a multi-TRP DMRS port group configuration data structure, based at least in part on the first UE being configured to receive multi-TRP communications, means for assigning, to a second UE, one of a second multi-TRP DMRS port group configuration specified in the multi-TRP DMRS port group configuration data structure, or a single-TRP DMRS port group configuration specified in a single-TRP DMRS port group configuration data structure, and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3A:
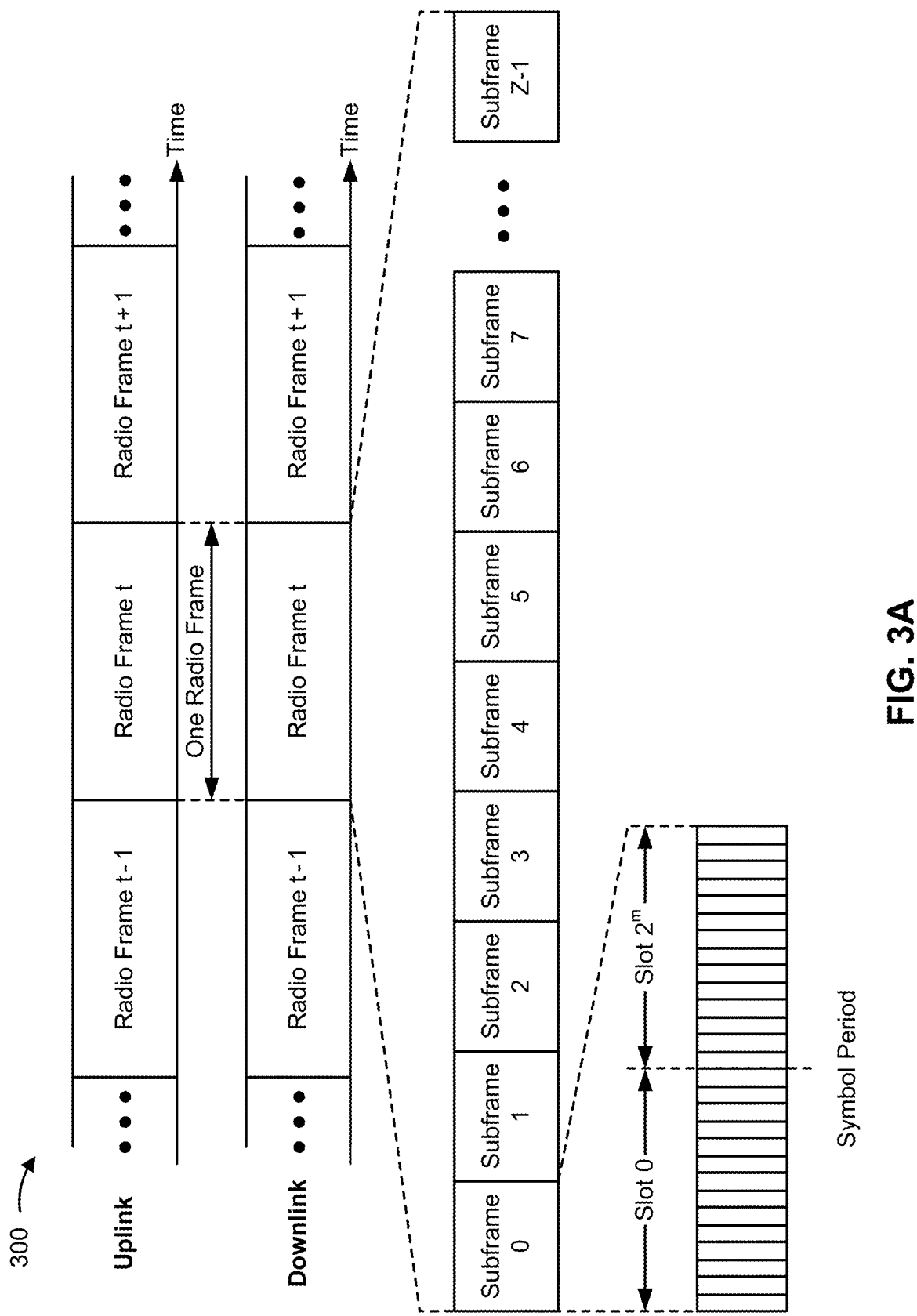
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like. In some aspects, a BS may transmit, to a UE, a downlink control information communication, which may include information identifying one or more demodulation reference signal ports for channel estimation. A demodulation reference signal port may specify a particular resource configuration of one or more slots included in a subframe. For example, a demodulation signal port may specify one or more resource elements, included in one or more slots, that may carry a demodulation reference signal for channel estimation.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
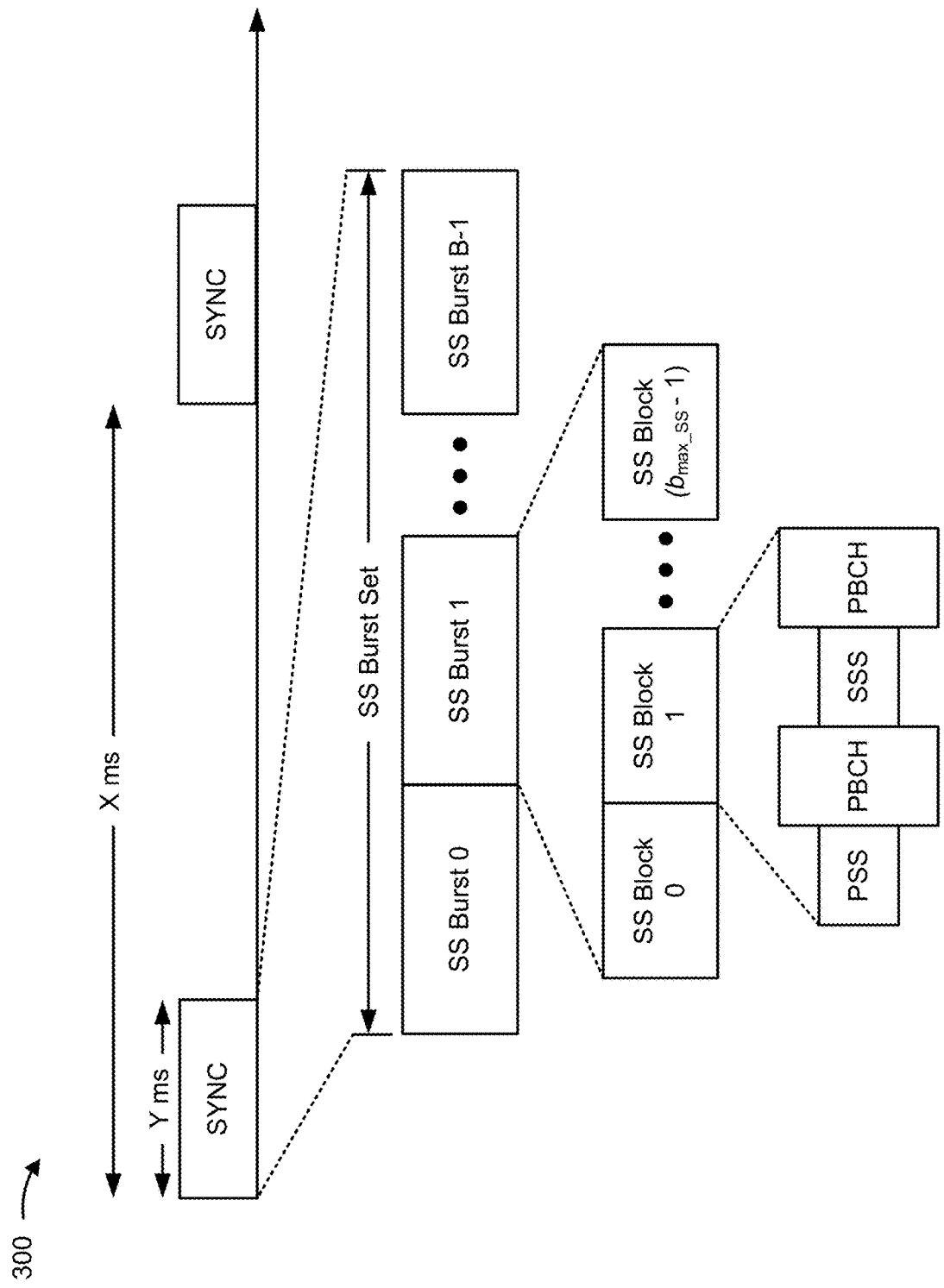
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
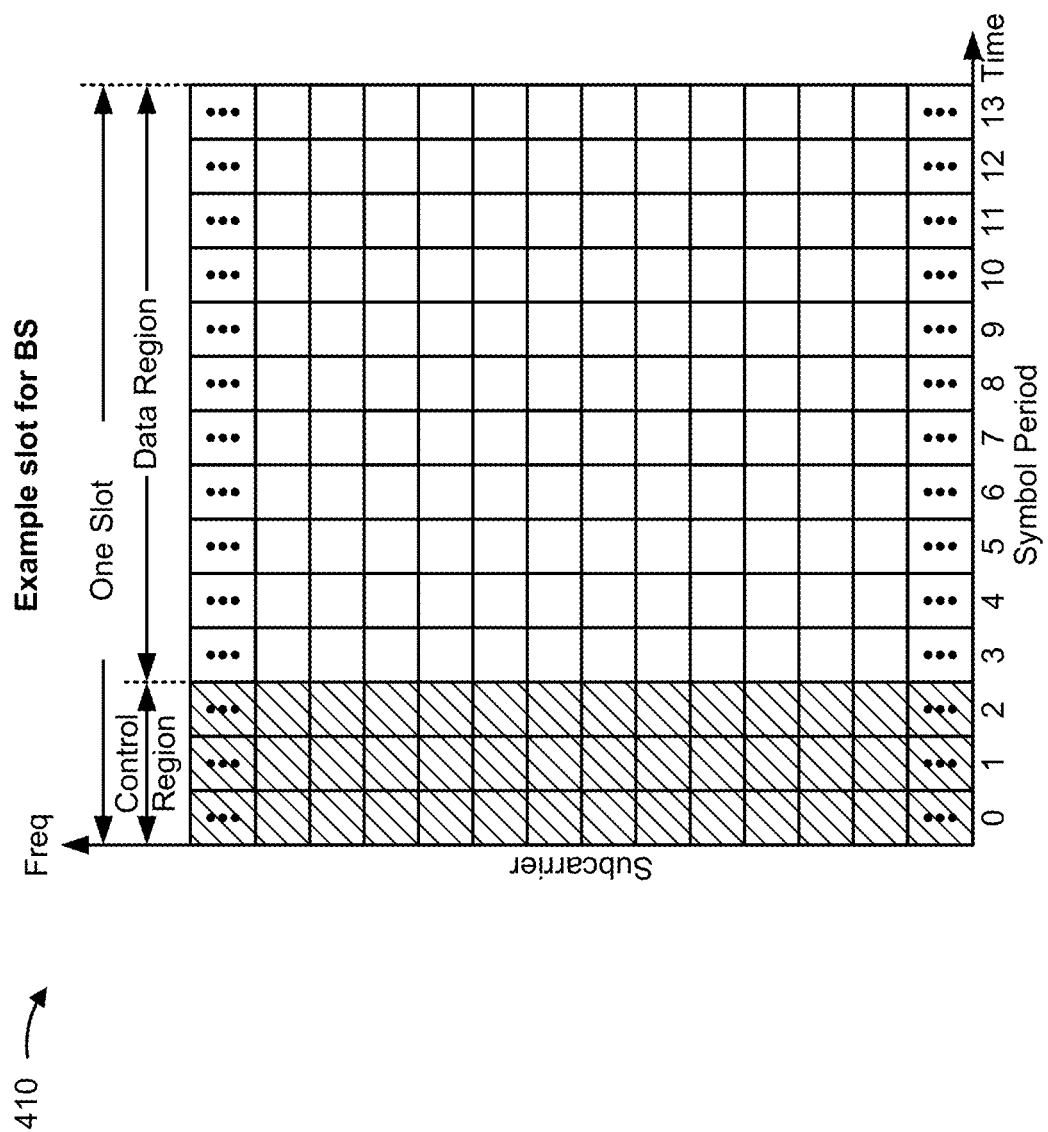
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, a BS may transmit, to a UE, a downlink control information communication, which may include information identifying one or more demodulation reference signal ports for channel estimation. A demodulation reference signal port may specify a particular resource configuration of one or more slots included in a subframe. For example, a demodulation signal port may specify one or more resource elements, included in one or more slots, that may carry a demodulation reference signal for channel estimation.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
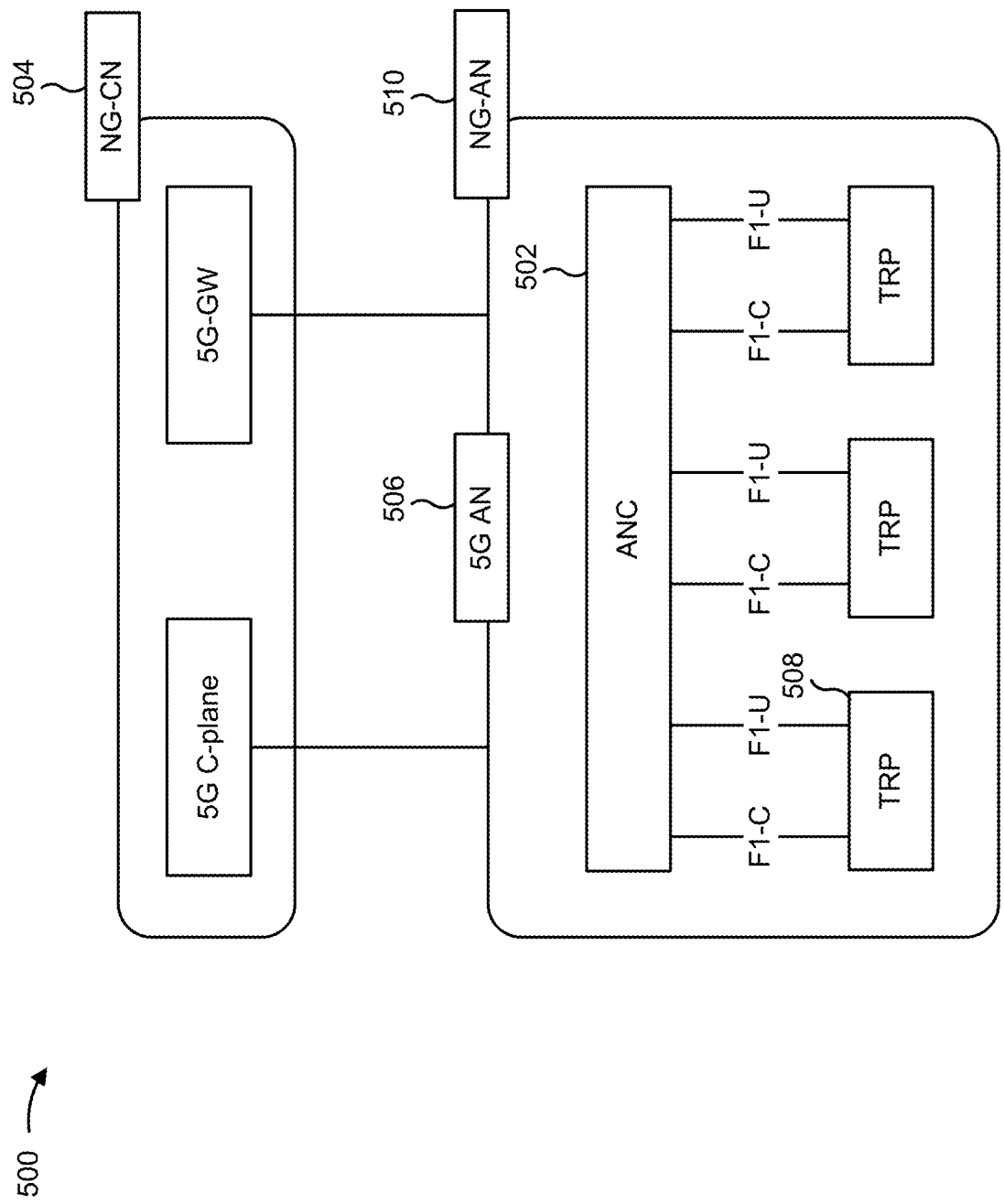
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present. In some implementations, the architecture may enable multi-TRP communications within RAN 500. For example, a first TRP 508 may transmit a first downlink layer to a UE and a second TRP 508 may transmit a second downlink layer to the UE. As another example, a first TRP 508 may transmit a portion of a downlink layer to a UE and a second TRP 508 may transmit another portion of the downlink layer to the UE.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
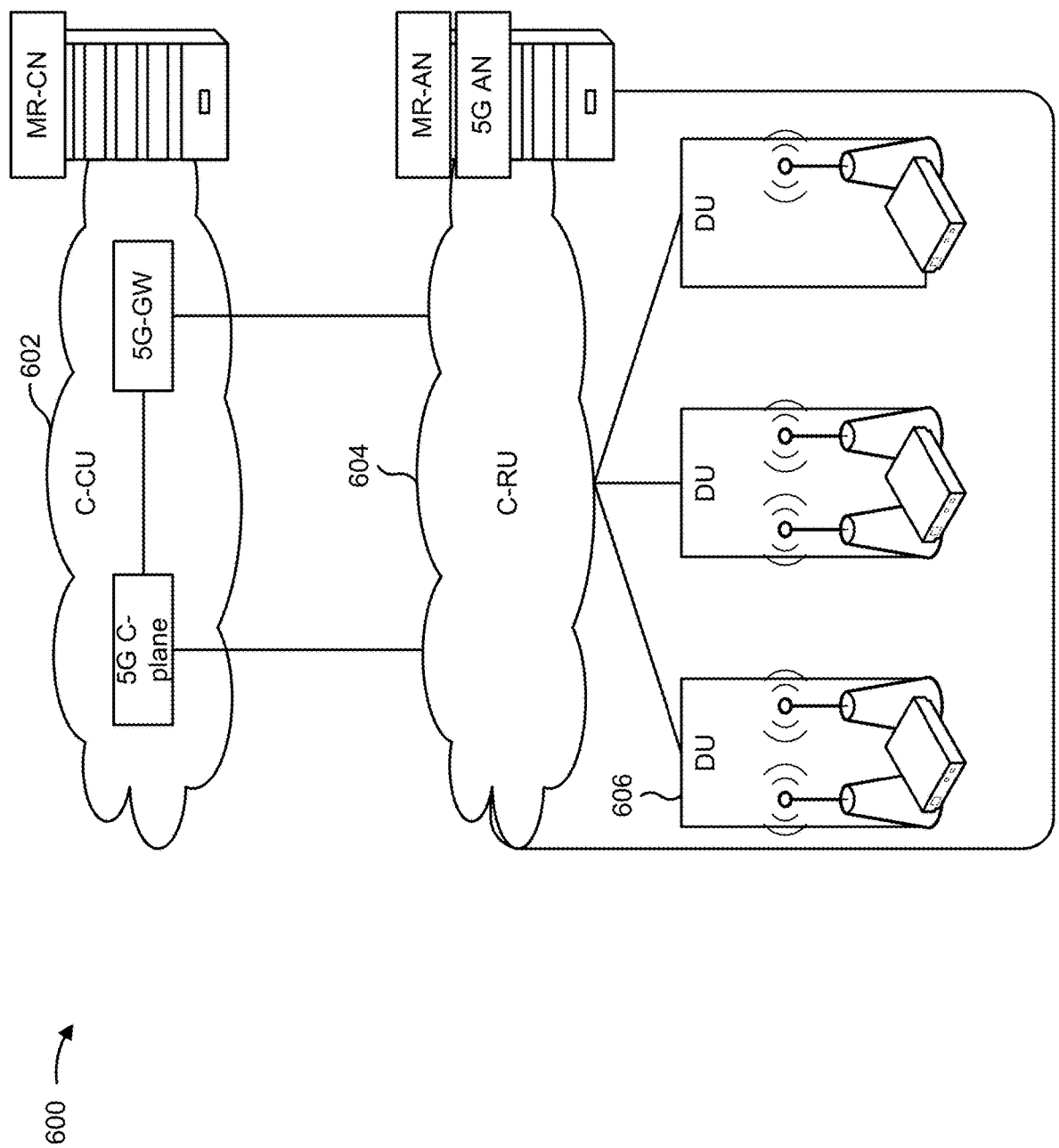
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality. As explained above, the one or more TRPs may enable multi-TRP communications. For example, a first TRP may transmit a first downlink layer to a UE and a second TRP may transmit a second downlink layer to the UE. As another example, a first TRP may transmit a portion of a downlink layer to a UE and a second TRP may transmit another portion of the downlink layer to the UE.

As indicated above, FIG. 6 is provided merely as an example. Other examples may differ from what is described with regard to FIG. 6.

Figure 7A:
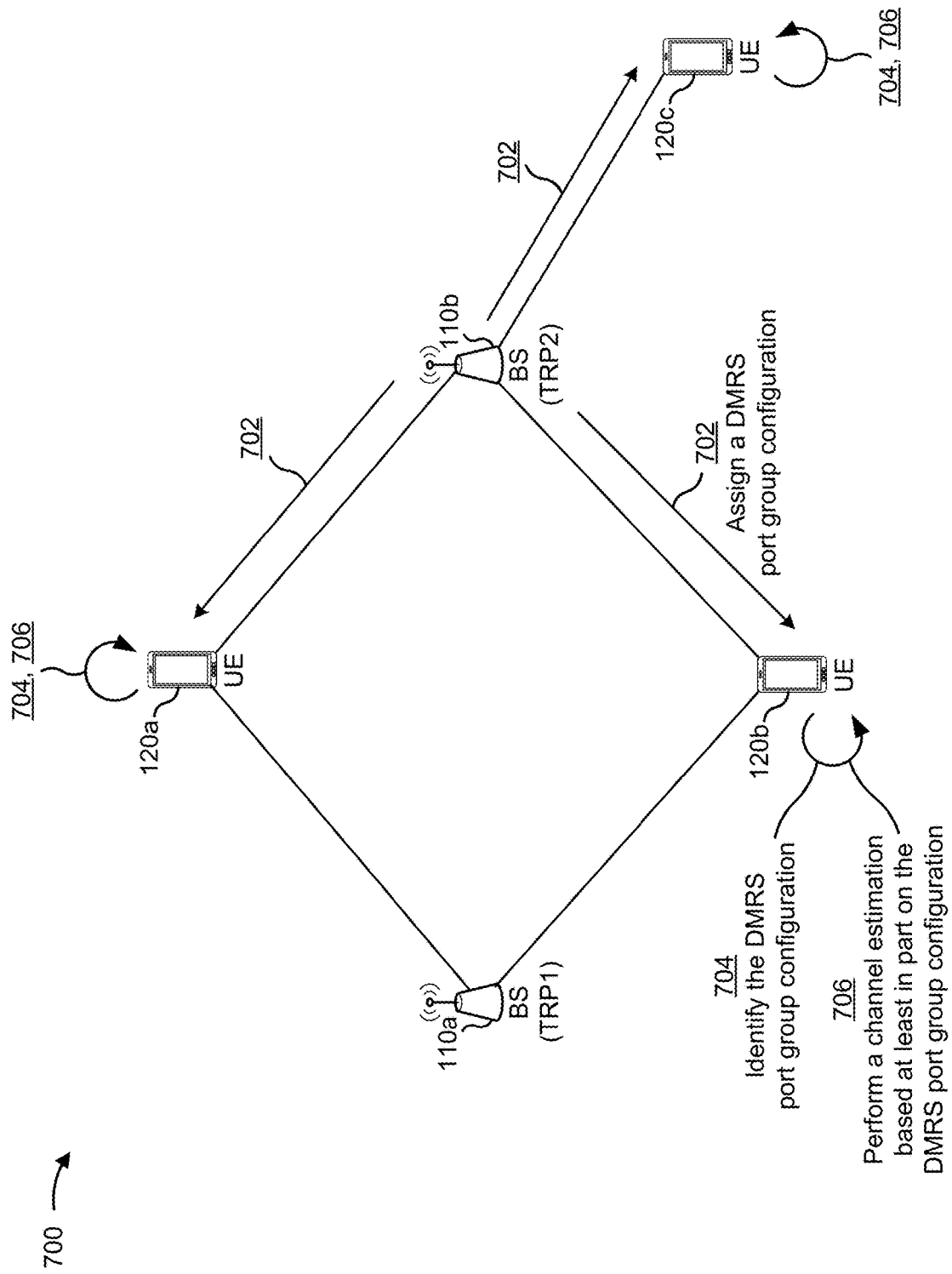
FIGS. 7A and 7B are diagrams illustrating an example of multi-transmit receive point (TRP) demodulation reference signal port identification, in accordance with various aspects of the present disclosure.
Figure 7B:
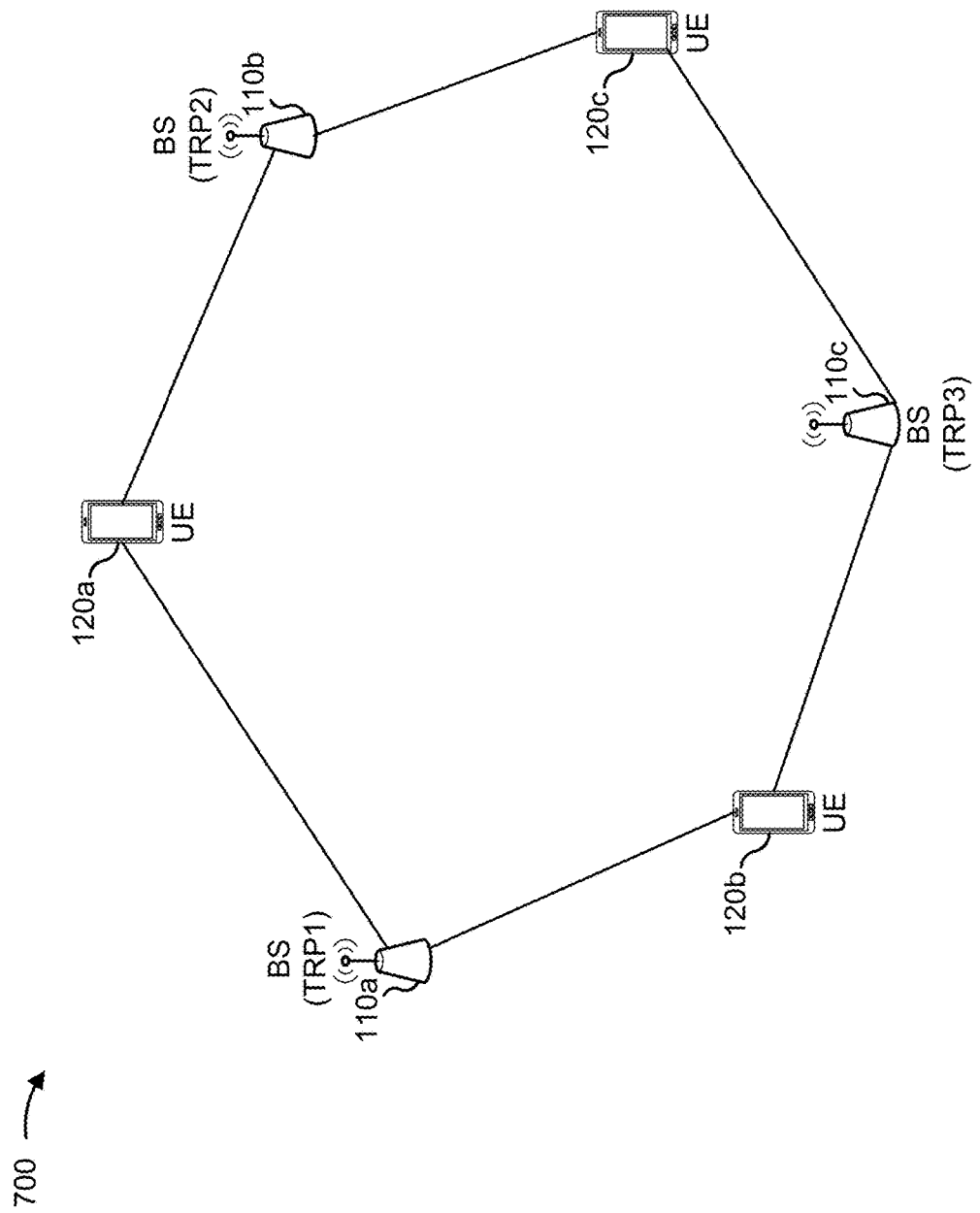

FIGS. 7A and 7B are diagrams illustrating an example 700 of multi-transmit receive point demodulation reference signal port identification, in accordance with various aspects of the present disclosure. As shown in FIGS. 7A and 7B, example 700 may include a plurality of transmit receive points (TRPs) (e.g., TRP1, TRP2, TRPS, and/or the like) and a plurality of UEs (e.g., UE 120*a*, UE 120*b*, UE 120*c*, and/or the like). In some aspects, each TRP, of the plurality of TRPs, may corresponds to a respective base station (e.g., BS 110*a*, BS 110*b*, BS 110*c*, and/or the like), as illustrated in FIGS. 7A and 7B, may be correspond to the same base station, and/or the like.

In some aspects, the plurality of TRPs and the plurality of UEs may be included in a wireless network. In some aspects, each UE, of the plurality of UEs, may be communicatively connected with one or more TRPs. For example, and as illustrated in FIG. 7A, UE 120*a* may be communicatively connected with TRP1 and TRP2 in a multi-TRP configuration, UE 120*b* may be communicatively connected with TRP1 and TRP2 in a multi-TRP configuration, UE 120*c* may be communicatively connected with TRP2 in a single-TRP configuration, and/or the like. As another example, and as illustrated in FIG. 7B, UE 120*a* may be communicatively connected with TRP1 and TRP2 in a multi-TRP configuration, UE 120*b* may be communicatively connected with TRP1 and TRP3 in a multi-TRP configuration, UE 120*c* may be communicatively connected with TRP2 and TRP3 in a multi-TRP configuration, and/or the like. In some aspects, a TRP, of the plurality of TRPs, may transmit one or more downlink layers (also referred to as downlink data streams), to one or more UEs, on a downlink of a wireless communication link between the TRP and the one or more UEs.

In some aspects, a UE may perform a channel estimation of a downlink of a wireless communication link between the UE and one or more TRPs. For example, UE 120*a* may perform a channel estimation of a downlink between UE 120*a* and TRP1, may perform another channel estimation of a downlink between UE 120*a* and TRP2, and so on. In some aspects, if a TRP transmits a plurality of downlink layers on the downlink, the UE may perform a channel estimation for each downlink layer of the plurality of layers.

In some aspects, a TRP may transmit a demodulation reference signal (DMRS) to a UE so that the UE may perform a channel estimation of a downlink, between the UE and the TRP, based at least in part on the DMRS. The TRP may configure the UE with DMRS information so that the UE may identify the DMRS in the downlink. For example, the TRP may configure the UE with one or more DMRS port group configuration data structures. In some aspects, a DMRS port group configuration data structure may include a table, a database, an electronic file, and/or the like, that includes one or more DMRS port group configurations. A DMRS port group configuration may include information identifying one or more DMRS port groups that the UE is to use to identify a DMRS transmitted to the UE. A DMRS port group configuration may be associated with a DMRS port group index, which may be a value, an identifier, and/or the like, that may be used to identify the DMRS port group configuration in a DMRS port group configuration data structure.

In some aspects, the TRP may transmit, to the UE, a plurality of DMRS port group configuration data structures. For example, the TRP may transmit one or more single-TRP port group configuration data structures (e.g., for use in performing a channel estimation for a downlink that is configured for single-TRP communications), may transmit one or more multi-TRP port group configuration data structures (e.g., for use in performing a channel estimation for a downlink that is configured for multi-TRP communications), and/or the like. Each DMRS port group configuration data structure may be associated with a particular combination of DMRS configuration type (e.g., Type 1, Type 2, and/or the like), codeword configuration (e.g., a quantity of codewords transmitted by the TRP on the downlink), front-loaded OFDM symbol configuration (e.g., a quantity of front-loaded OFDM symbols for each downlink communication that is transmitted by the TRP), and/or the like. The following tables illustrate various example DMRS port group configuration data structures, but other DMRS port group configuration data structures may be used.

TABLE 1

Single-TRP - One Codeword

| DMRS Port Group Configuration Index | DMRS Ports |
| --- | --- |
| 0 | {0} |
| 1 | {1} |
| 2 | {0, 1} |
| 3 | {0} |
| 4 | {1} |
| 5 | {2} |
| 6 | {3} |
| 7 | {0, 1} |
| 8 | {2, 3} |
| 9 | {0-2} |
| 10 | {0-3} |
| 11 | {0} |
| 12 | {1} |
| 13 | {2} |
| 14 | {3} |
| 15 | {4} |
| 16 | {5} |
| 17 | {0, 1} |
| 18 | {2, 3} |
| 19 | {4.5} |
| 20 | {0-2} |
| 21 | {3-5} |
| 22 | {0-3} |
| 23 | {0, 2} |
| 24-31 | Reserved |

TABLE 2

Multi-TRP - One Codeword - DMRS Type 1 - One Front-Loaded OFDM Symbol

| DMRS Port Group Configuration Index | DMRS Ports |
| --- | --- |
| 0 | {0}, {2} |
| 1 | {1}, {3} |
| 2 | {0, 1}, {2} |
| 3 | {2, 3}, {0} |
| 4 | {0, 1}, {2, 3} |
| 5 | {0}, {2} |

TABLE 3

Multi-TRP - One Codeword - DMRS Type 1 - Two Front-Loaded OFDM Symbols

| DMRS Port Group Configuration Index | DMRS Ports |
| --- | --- |
| 0 | {0}, {2} |
| 1 | {1}, {3} |
| 2 | {4}, {6} |
| 3 | {5}, {7} |
| 4 | {0, 1}, {2} |
| 5 | {4, 5}, {3} |
| 6 | {2, 3}, {0} |
| 7 | {6, 7}, {1} |
| 8 | {0, 1}, {2, 3} |
| 9 | {4, 5}, {6, 7} |
| 10 | {0, 1, 4}, {2} |
| 11 | {3, 6, 7}, {5} |

TABLE 4

Multi-TRP - Two Codewords - DMRS Type 1 - Two Front-Loaded OFDM Symbols

| DMRS Port Group Configuration Index | DMRS Ports |
| --- | --- |
| 0 | {0, 1, 4}, {2, 3} |
| 1 | {2, 3, 6}, {0, 1} |
| 2 | {0, 1, 4}, {2, 3, 6} |
| 3 | {0, 1, 4, 5}, {2, 3, 6} |
| 4 | {2, 3, 6, 7}, {0, 1, 4} |
| 5 | {0, 1, 4, 5}, {2, 3, 6, 7} |
| 6 | {0, 1, 4, 5}, {2} |
| 7 | {2, 3, 6, 7}, {0} |
| 8 | {0, 1, 4, 5}, {2, 3} |
| 9 | {2, 3, 6, 7}, {0, 1} |

TABLE 5

Multi-TRP - One Codeword - DMRS Type 2 - One Front-Loaded OFDM Symbol

| DMRS Port Group Configuration Index | DMRS Ports |
| --- | --- |
| 0 | {0}, {2} |
| 1 | {1}, {3} |
| 2 | {1}, {4} |
| 3 | {3}, {5} |
| 4 | {0, 1}, {2} |
| 5 | {4, 5}, {3} |
| 6 | {2, 3}, {0} |
| 7 | {4, 5}, {1} |
| 8 | {0, 1}, {2, 3} |

TABLE 6

Multi-TRP - Two Codewords - DMRS Type 2 - One Front-Loaded OFDM Symbol

| DMRS Port Group Configuration Index | DMRS Ports |
| --- | --- |
| 0 | {0, 1, 2}, {4, 5} |
| 1 | {2, 3, 4}, {0, 1} |
| 2 | {0, 1, 2, 3}, {4} |
| 3 | {2, 3, 4, 5}, {0} |
| 4 | {0, 1, 2, 3}, {4, 5} |
| 5 | {0, 1}, {2, 3, 4, 5} |

TABLE 7

Multi-TRP - Two Codewords - DMRS Type 2 - Two Font-Loaded OFDM Symbols

| DMRS Port Group Configuration Index | DMRS Ports |
| --- | --- |
| 0 | {0}, {2} |
| 1 | {1}, {3} |
| 2 | {6}, {8} |
| 3 | {7}, {9} |
| 4 | {6}, {4} |
| 5 | {7}, {5} |
| 6 | {8}, {10} |
| 7 | {9}, {11} |
| 8 | {0, 1}, {2} |
| 9 | {8, 9}, {6} |
| 10 | {6, 7}, {3} |
| 11 | {4, 5}, {8} |
| 12 | {10, 11}, {9} |
| 13 | {0, 1}, {2, 3} |
| 14 | {6, 7}, {8, 9} |
| 15 | {6, 7}, {4, 5} |
| 16 | {8, 9}, {10, 11} |
| 17 | {0, 1, 6}, {2} |
| 18 | {3, 8, 9}, {7} |
| 19 | {4, 5, 10}, {7} |
| 20 | {3, 8, 9}, {11} |

TABLE 8

Multi-TRP - Two Codewords - DMRS Type 2 - Two Font-Loaded OFDM Symbols

| DMRS Port Group Configuration Index | DMRS Ports |
| --- | --- |
| 0 | {0, 1, 6}, {2, 3} |
| 1 | {4, 5, 10}, {8, 9} |
| 2 | {2, 3, 8}, {0, 1} |
| 3 | {4, 5, 10}, {6, 7} |
| 4 | {0, 1, 6}, {2, 3, 8} |
| 5 | {2, 3, 8}, {4, 5, 10} |
| 6 | {0, 1, 6, 7}, {2, 3, 8} |
| 7 | {2, 3, 8, 9}, {4, 5, 10} |
| 8 | {0, 1, 6, 7}, {2, 3, 8, 9} |
| 9 | {2, 3, 8, 9}, {4, 5, 10, 11} |
| 10 | {0, 1, 6, 7}, {2} |
| 11 | {4, 5, 10, 11}, {3} |
| 12 | {2, 3, 8, 9}, {0} |
| 13 | {0, 1, 6, 7}, {2, 3} |
| 14 | {4, 5, 10, 11}, {8, 9} |
| 15 | {2, 3, 8, 9}, {0, 1} |
| 16 | {4, 5, 10, 11}, {6, 7} |
| 17 | {0, 1, 6, 7, 2, 3}, {4} |
| 18 | {0, 1, 6, 7, 2}, {4, 5, 10} |
| 19 | {0, 1, 6, 7, 2, 3}, {4, 5} |
| 20 | {0, 1, 6, 7, 2, 3, 8}, {4} |

As shown in Table 1 above, each single-TRP DMRS port group configuration included in the single-TRP DMRS port group configuration data structure may be associated with a unique DMRS port group configuration index in the single-TRP DMRS port group configuration data structure, and a DMRS port group that includes one or more DMRS ports. The DMRS port groups included in the single-TRP DMRS port group configuration data structure may be associated with a TRP.

As shown in Table 2 through Table 8, each multi-TRP DMRS port group configuration, included in a particular multi-TRP DMRS port group configuration data structure, may be associated with a DMRS port group configuration index, that is unique within the particular multi-TRP DMRS port group configuration data structure, and a plurality of DMRS port groups. Each DMRS port group, of the plurality of DMRS port groups included in a particular multi-TRP DMRS port group configuration, may be associated with a different TRP. For example, DMRS port group configuration index 5, included in Table 8, may include a first DMRS port group {2,3,8} that is associated with a first TRP, and a second DMRS port group {4,5,10} that is associated with a second TRP. Each of the DMRS ports, included in a particular DMRS port group, may be associated with a different downlink layer that is transmitted by the TRP associated with the DMRS port group.

In some aspects, a multi-TRP DMRS port group configuration data structure may include a plurality of multi-TRP DMRS port group configurations for the same TRP. Each of the multi-TRP DMRS port group configurations associated with the TRP may be configured with a different order of a plurality of DMRS port groups associated with the TRP. For example, a first multi-TRP DMRS port group configuration may be configured with a first order of the plurality of DMRS port groups (e.g., ({0}, {2}) or e.g., ({0,1}, {2})) and a second multi-TRP DMRS port group configuration may be configured with a second order of the plurality of DMRS port groups (reverse order relative to the first order, e.g. ({2}, {0}) or e.g. ({2}, {0,1})).

In some aspects, a TRP may transmit, to a UE, one or more single-TRP DMRS port group configuration data structures and/or one or more multi-TRP DMRS port group configuration data structures in a radio resource control (RRC) communication and/or another type of signaling communication. In addition, the TRP may configure the UE, via the RRC communication and/or any other type of signaling communication, to use a particular codeword configuration, a particular DMRS type configuration, and/or a particular front-loaded OFDM symbol configuration for the TRP.

As shown in FIG. 7A, and as shown by reference number 702, a TRP may assign a DMRS port group configuration to one or more UEs. For example, TRP1 may assign UE 120a a DMRS port group configuration and may assign UE 120b a DMRS port group configuration, TRP2 may assign UE 120a a DMRS port group configuration, may assign UE 120b a DMRS port group configuration, and may assign UE 120c a DMRS port group configuration, and/or the like.

In some aspects, a TRP may assign a DMRS port group configuration to a UE by transmitting a downlink control information (DCI) communication and/or another type of signaling communication. The DCI communication may include information identifying a transmission control indication (TCI) state, which may indicate a quasi-co-location (QCL) relationship between a resource signal (RS) set (which may include a synchronization signal block (SSB) reference signal, a channel state information (CSI) reference signal, and/or the like) and a DMRS port group, may indicate a plurality of QCL relationships, where each QCL relationship, of the plurality of QCL relationships, is between a respective RS set and a respective DMRS port group, and/or the like. The DCI communication may also include information identifying a DMRS port group configuration that is to be used by the UE for channel estimation of the downlink between the UE and the TRP, such as a DMRS port group configuration index.

As further shown in FIG. 7A, and by reference number 704, a UE may receive a DCI communication from a TRP and may identify a DMRS port group configuration based at least in part on the information included in the DCI communication, the one or more DMRS port group configuration data structures received from the TRP, the codeword configuration received from the TRP, the DMRS type configuration received from the TRP, the front-loaded OFDM symbol configuration received from the TRP, and/or the like.

As described above, the DCI communication may include information identifying a TCI state, information identifying a DMRS port group configuration index, and/or the like. The TCI state may specify a quantity of QCL relationships between one or more RS sets and one or more DMRS port groups. In some aspects, the UE may identify the DMRS port group configuration data structure in which to perform a lookup of the DMRS port group configuration index based at least in part on the quantity of QCL relationships specified by the TCI state in the DCI communication. For example, if the TCI state indicates one QCL relationship, the UE may determine that the TCI state corresponds to one DMRS port group (e.g., that is associated with one TRP), and therefore the UE is to perform the lookup in a single-TRP DMRS port group configuration data structure. As another example, if the TCI state indicates two QCL relationships, the UE may determine that the TCI state corresponds to two DMRS port groups (e.g., where each DMRS port group is associated with a different TRP), and therefore the UE is to perform a lookup in a multi-TRP DMRS port group configuration data structure. Accordingly, the UE may identify the DMRS port group configuration data structure, may identify the DMRS port group configuration associated with the DMRS port group configuration index identified in the DCI communication, and may identify the DMRS port group(s) included in the DMRS port group configuration.

As an example of the above, and based on the configuration of the wireless network illustrated in FIG. 7A, UE 120b may receive a DCI communication from TRP2. UE 120b may identify, in the DCI communication, information identifying a TCI state and information identifying a DMRS port group configuration index 13. UE 120b may determine that the TCI state specifies a quantity of QCL relationships of two, which indicates a first QCL relationship between a first RS set and a first DMRS port group (which may be associated with TRP2) and a second QCL relationship between a second RS set and a second DMRS port group (which may be associated with TRP1). Accordingly, UE 120b may determine that, since the TCI state specifies two QCL relationships, UE 120b is to perform a lookup of the DMRS port group configuration index in a multi-TRP DMRS port group configuration data structure.

Moreover, UE 120b may have received, from TRP2, information specifying a codeword configuration of one codeword, a DMRS type configuration of DMRS Type 2, and a front-loaded OFDM symbol configuration of two front-loaded OFDM symbols. As a result, UE 120b may determine to perform the lookup in the multi-TRP DMRS port group configuration data structure similar to Table 7 illustrated above.

Accordingly, UE 120b may identify the DMRS port group configuration index 13 in Table 7, and may identify the first DMRS port group {0,1} (which includes a first DMRS port associated with a first downlink layer and a second DMRS port associated with a second downlink layer) and the second DMRS port group {2,3} (which also includes a first DMRS port associated with a first downlink layer and a second DMRS port associated with a second downlink layer). In some aspects, the first DMRS port group may be associated with the TRP that transmitted the DCI communication, and accordingly UE 120b may implicitly associate the first DMRS port group with TRP2 and the second DMRS port group with TRP1, and Table 7 may include a DMRS port group configuration that includes {0,1} as the first DMRS port group and {2,3} as the second DMRS port group. In some aspects, the TCI field (or another field included in the DCI communication) may explicitly specify which TRP is associated with the first DMRS port group and which TRP is associated with the second DMRS port group.

Continuing with the example based on the wireless network configuration illustrated in FIG. 7A, UE 120*a* may receive a DCI communication from TRP2. UE 120*a* may identify, in the DCI communication, information identifying a TCI state and information identifying a DMRS port group configuration index 14. UE 120*a* may determine that the TCI state specifies a quantity of QCL relationships of two, which indicates a first QCL relationship between a first RS set and a first DMRS port group (which may be associated with TRP2) and a second QCL relationship between a second RS set and a second DMRS port group (which may be associated with TRP1). Accordingly, UE 120*a* may determine that, since the TCI state specifies two QCL relationships, UE 120*a* is to perform a lookup of the DMRS port group configuration index in a multi-TRP DMRS port group configuration data structure.

Moreover, UE 120*a* may have received, from TRP2, information specifying a codeword configuration of one codeword, a DMRS type configuration of DMRS Type 2, and a front-loaded OFDM symbol configuration of two front-loaded OFDM symbols. As a result, UE 120*a* may determine to perform the lookup in the multi-TRP DMRS port group configuration data structure similar to Table 7 illustrated above.

Accordingly, UE 120*a* may identify the DMRS port group configuration index 14 in Table 7, and may identify the first DMRS port group {6,7} (which includes a first DMRS port associated with a first downlink layer and a second DMRS port associated with a second downlink layer) and the second DMRS port group {8,9} (which also includes a first DMRS port associated with a first downlink layer and a second DMRS port associated with a second downlink layer). In some aspects, the first DMRS port group may be associated with the TRP that transmitted the DCI communication, and accordingly UE 120*a* may implicitly associate the first DMRS port group with TRP2 and the second DMRS port group with TRP1, and Table 7 may include a DMRS port group configuration that includes {6,7} as the first DMRS port group and {8,9} as the second DMRS port group. In some aspects, the TCI state (or another field included in the DCI communication) may explicitly specify which TRP is associated with the first DMRS port group and which TRP is associated with the second DMRS port group.

Continuing with the example based on the wireless network configuration illustrated in FIG. 7A, UE 120*c* may receive a DCI communication from TRP2. UE 120*c* may identify, in the DCI communication, information identifying a TCI state and information identifying a DMRS port group configuration index 19. UE 120*c* may determine that the TCI state specifies a quantity of QCL relationships of one, which indicates a QCL relationship between a RS set and a DMRS port group (which may be associated with TRP2). Accordingly, UE 120*c* may determine that, since the TCI state specifies one QCL relationship, UE 120*c* is to perform a lookup of the DMRS port group configuration index in a single-TRP DMRS port group configuration data structure.

Moreover, UE 120*c* may have received, from TRP2, information specifying a codeword configuration of one codeword, a DMRS type configuration of DMRS Type 1, and a front-loaded OFDM symbol configuration of one front-loaded OFDM symbol. As a result, UE 120*c* may determine to perform the lookup in the single-TRP DMRS port group configuration data structure similar to Table 1 illustrated above. Accordingly, UE 120*c* may identify the DMRS port group configuration index 19 in Table 1, and may identify the DMRS port group {4,5} (which includes two DMRS ports, each associated with a respective downlink layer associated with TRP2). In this way, TRP2 configures UE 120*a* and UE 120*b* with sets of DMRS port groups, wherein the first DMRS port group and the second DMRS port group, for each of UE 120*a* and UE 120*b*, include DMRS ports that are not included in the same CDM group.

As another example of the above, and based on the configuration of the wireless network illustrated in FIG. 7B, UE 120*a* may be configured with a DMRS port group configuration index 13 included in a multi-TRP DMRS port group configuration data structure similar to Table 7 illustrated above (e.g., a first DMRS port group {0,1} associated with TRP1 and a second DMRS port group {2,3} associated with TRP2), UE 120*b* may be configured with a DMRS port group configuration index 15 included in a multi-TRP DMRS port group configuration data structure similar to Table 7 illustrated above (e.g., a first DMRS port group {6,7} associated with TRP3 and a second DMRS port group {4,5} associated with TRP1), and UE 120*c* may be configured with a DMRS port group configuration index 16 included in a multi-TRP DMRS port group configuration data structure similar to Table 7 illustrated above (e.g., a first DMRS port group {8,9} associated with TRP3 and a second DMRS port group {10,11} associated with TRP2).

Returning to FIG. 7A, and by reference number 706, a UE may perform, based at least in part on the identified DMRS port group configuration, a channel estimation of a downlink between the UE and the TRP that transmitted the DCI communication. For example, the UE may identify, based at least in part on the resource configuration specified by a DMRS port included in a DMRS port group that is included in the DMRS port group configuration, a DMRS transmitted by the TRP on the downlink, may detect the DMRS, and may perform one or more measurements based at least in part on the detected DMRS (e.g., a signal quality measurement, a signal strength measurement, and/or the like), and may provide the measurements to the TRP so that the TRP may adjust one or more parameters associated with the downlink to optimize the downlink for communication with the UE. In some aspects, the UE may perform a channel estimation for each DMRS port identified in the DMRS port group configuration. For example, UE 120*b* may perform a channel estimation for each DMRS port associated with TRP2 (e.g., which may include a channel estimation for each downlink layer transmitted by TRP2), may perform a channel estimation for each DMRS port associated with TRP1 (e.g., with may include a channel estimation for each downlink layer transmitted by TRP1), and/or the like.

In this way, the multi-TRP DRMS port group configuration data structures may include a quantity of DMRS port groups that are capable of supporting multi-TRP in a wireless network, which allows UEs in the wireless network to perform channel estimation, based at least in part on a DMRS, in a multi-TRP configuration. In this way, the UEs are capable of performing channel estimation in a multi-TRP wireless network, which was not previously capable without the multi-TRP DMRS port group configuration data structure, which allows the UEs and the TRPs in the multi-TRP wireless network to optimize downlink parameters, which in turn improves throughput in the wireless network, reduces downlink transmission errors, and conserves wireless network resources that would have otherwise been consumed on retransmitting downlink communications due to downlink transmission errors and/or dropped downlink communications.

As indicated above, FIGS. 7A and 7B are provided as an example. Other examples may differ from what is described with respect to FIGS. 7A and 7B.

FIG. 8 is a diagram illustrating an example process 800 performed, for example, by a UE, in accordance with various aspects of the present disclosure. Example process 800 is an example where a UE (e.g., UE 120, UE 120a, UE 120b, UE 120c, and/or the like) performs multi-transmit receive point demodulation reference signal port identification.

As shown in FIG. 8, in some aspects, process 800 may include receiving a DCI that includes a TCI state (block 810). For example, the UE (e.g., using receive processor 258, controller/processor 280, memory 282, and/or the like) may receive a DCI that includes a TCI state, as described above.

As further shown in FIG. 8, in some aspects, process 800 may include determining that the TCI state specifies a quantity of two or more QCL relationships (block 820). For example, the UE (e.g., using controller/processor 280, memory 282, and/or the like) may determine that the TCI state specifies a quantity of two or more QCL relationships, as described above.

As further shown in FIG. 8, in some aspects, process 800 may include identifying, based at least in part on the determining, a multi-TRP DMRS port group configuration included in a multi-TRP DMRS port group configuration data structure (block 830). For example, the UE (e.g., using controller/processor 280, memory 282, and/or the like) may identify, based at least in part on the determining, a multi-TRP DMRS port group configuration included in a multi-TRP DMRS port group configuration data structure, as described above.

As further shown in FIG. 8, in some aspects, process 800 may include performing, based at least in part on the multi-TRP DMRS port group configuration, a channel estimation for a downlink of a wireless communication link between the UE and the TRP (block 840). For example, the UE (e.g., using receive processor 258, transmit processor 264, controller/processor 280, memory 282, and/or the like) may perform, based at least in part on the multi-TRP DMRS port group configuration, a channel estimation for a downlink of a wireless communication link between the UE and the TRP, as described above.

Process 800 may include additional aspects, such as any single aspect or any combination of aspects described below and/or in connection with one or more other processes described elsewhere herein.

In a first aspect, process 800 further comprises performing, based at least in part on the multi-TRP DMRS port group configuration, another channel estimation for another downlink of another wireless communication link between the UE and another TRP. In a second aspect, alone or in combination with the first aspect, the TCI state specifies a quantity of two quantity of QCL relationships that specify two DMRS port groups, a first DMRS port group, of the two DMRS port groups, is associated with the TRP, and a second DMRS port group, of the two DMRS port groups, is associated with another TRP to which the UE is communicatively connected.

In a third aspect, alone or in combination with one or more of the first or second aspects, the first DMRS port group is quasi-co-located with a first RS set associated with the TRP, the second DMRS port group is quasi-co-located with a second RS set associated with another TRP, and one or more first DMRS ports, included in the first DMRS port group, and one or more second DMRS ports, included in the second DMRS port group, are not included in a same DMRS CDM group. In a fourth aspect, alone or in combination with one or more of the first through third aspects, the first DMRS port group is ordered before the second DMRS port group in the multi-TRP DMRS port group configuration, and the second DMRS port group is ordered before the first DMRS port group in another multi-TRP DMRS port group configuration included in the multi-TRP DMRS port group configuration data structure.

In a fifth aspect, alone or in combination with one or more of the first through fourth aspects, the TCI state specifies an order of the first DMRS port group and the second DMRS port group in the multi-TRP DMRS port group configuration. In a sixth aspect, alone or in combination with one or more of the first through fifth aspects, the second quantity of QCL relationships is associated with a single-TRP DMRS port group configuration data structure. In a seventh aspect, alone or in combination with one or more of the first through sixth aspects, identifying the multi-TRP DMRS port group configuration comprises identifying the multi-TRP DMRS port group configuration based at least in part on a multi-TRP DMRS port group configuration index identified in the DCI communication.

In an eighth aspect, alone or in combination with one or more of the first through seventh aspects, the multi-TRP DMRS port group configuration, associated with the UE, comprises information identifying a first DMRS port group associated with the TRP and information identifying a second DMRS port group associated with another TRP, the first DMRS port group including one or more first DMRS ports associated with the TRP, and the second DMRS port group including one or more second DMRS ports associated with the other TRP. In a ninth aspect, alone or in combination with one or more of the first through eighth aspects, each DMRS port, of the one or more first DMRS ports, is associated with a respective downlink layer transmitted by the TRP.

In a tenth aspect, alone or in combination with one or more of the first through ninth aspects, the downlink, of the wireless communication link between the UE and the TRP, comprises a plurality of downlink transmission layers, and performing the channel estimation for the downlink of the wireless communication link between the UE and the TRP comprises identifying the plurality of downlink transmission layers based at least in part on the multi-TRP DMRS port group configuration data structure and perform the channel estimation for each downlink transmission layer of the plurality of downlink transmission layers.

In an eleventh aspect, alone or in combination with one or more of the first through tenth aspects, each downlink transmission layer, of the plurality of downlink transmission layers, is associated with a respective DMRS port identified in a multi-TRP DMRS port group configuration, associated with the UE, included in the multi-TRP DMRS port group configuration data structure. In a twelfth aspect, alone or in combination with one or more of the first through eleventh aspects, process 800 further comprises identifying the multi-TRP DMRS port group configuration data structure based at least in part on determining that the TCI state specifies a quantity of two or more QCL relationships.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a TRP, in accordance with various aspects of the present disclosure. Example process 900 is an example where a TRP (e.g., BS 110, BS 110a, BS 110b, TRP1, TRP2, and/or the like) performs multi-transmit receive point demodulation reference signal port identification.

As shown in FIG. 9, in some aspects, process 900 may include assigning, to a first UE, a first multi-TRP DMRS port group configuration, specified in a multi-TRP DMRS port group configuration data structure, based at least in part on the first UE being configured to receive multi-TRP communications (block 910). For example, the TRP (e.g., using controller/processor 240, memory 242, and/or the like) may assign, to a first UE, a first multi-TRP DMRS port group configuration, specified in a multi-TRP DMRS port group configuration data structure, based at least in part on the first UE being configured to receive multi-TRP communications, as described above.

As further shown in FIG. 9, in some aspects, process 900 may include assigning, to a second UE, one of a second multi-TRP DMRS port group configuration specified in the multi-TRP DMRS port group configuration data structure, or a single-TRP DMRS port group configuration specified in a single-TRP DMRS port group configuration data structure (block 920). For example, the TRP (e.g., using controller/processor 240, memory 242, and/or the like) may assign, to a second UE, one of a second multi-TRP DMRS port group configuration specified in the multi-TRP DMRS port group configuration data structure, or a single-TRP DMRS port group configuration specified in a single-TRP DMRS port group configuration data structure, as described above.

Process 900 may include additional aspects, such as any single aspect or any combination of aspects described below and/or in connection with one or more other processes described elsewhere herein.

In a first aspect, assigning one of the second multi-TRP DMRS port group configuration or the single-TRP DMRS port group configuration to the second UE comprises assigning one of the second multi-TRP DMRS port group configuration or the single-TRP DMRS port group configuration to the second UE based at least in part on a codeword configuration associated with the TRP, a front-loaded OFDM symbol configuration associated with the TRP, a DMRS type associated with the TRP, and/or the like.

In a second aspect, alone or in combination with the first aspect, assigning one of the second multi-TRP DMRS port group configuration or the single-TRP DMRS port group configuration to the second UE comprises assigning one of the second multi-TRP DMRS port group configuration or the single-TRP DMRS port group configuration to the second UE based at least in part on whether the second UE is configured to receive the multi-TRP communications or single-TRP communications.

In a third aspect, alone or in combination with one or more of the first or second aspects, the first multi-TRP DMRS port group configuration and the second multi-TRP DMRS port group configuration are different multi-TRP DMRS port group configurations.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving, from a transmit receive point (TRP), a downlink control information (DCI) that includes a transmission configuration indication (TCI) field;
determining that the TCI field specifies a quantity of two or more TCI states;
identifying, based at least in part on the determining, a multi-TRP demodulation reference signal (DMRS) port group configuration included in a multi-TRP DMRS port group configuration data structure comprising information identifying the multi-TRP DMRS port group configuration and a plurality of DMRS port groups, wherein the plurality of DMRS port groups include a first DMRS port group, associated with the TRP, and a second DRMS port group associated with another TRP; and performing, based at least in part on the first DMRS port group, a channel estimation for a downlink of a wireless communication link between the UE and the TRP.

2. The method of claim 1, further comprising:
performing, based at least in part on the first DMRS port group, another channel estimation for another downlink of another wireless communication link between the UE and another TRP.

3. The method of claim 1, wherein the quantity of two or more TCI states specify the plurality of DMRS port groups; and
wherein the UE is communicatively coupled to the other TRP.

4. The method of claim 3, wherein the first DMRS port group is quasi-co-located with a first reference signal (RS) set associated with the TRP;
wherein the second DMRS port group is quasi-co-located with a second RS set associated with the other TRP; and
wherein one or more first DMRS ports, included in the first DMRS port group, and one or more second DMRS ports, included in the second DMRS port group, are not included in a same DMRS code division multiplexing (CDM) group.

5. The method of claim 3, wherein the first DMRS port group is ordered before the second DMRS port group in the multi-TRP DMRS port group configuration; and
wherein the second DMRS port group is ordered before the first DMRS port group in another multi-TRP DMRS port group configuration included in the multi-TRP DMRS port group configuration data structure.

6. The method of claim 3, wherein the TCI field specifies an order of the first DMRS port group and the second DMRS port group in the multi-TRP DMRS port group configuration.

7. The method of claim 1, further comprising:
identifying the multi-TRP DMRS port group configuration data structure based at least in part on determining that the TCI field specifies a quantity of two or more TCI states.

8. The method of claim 1, wherein identifying the multi-TRP DMRS port group configuration comprises:
identifying the multi-TRP DMRS port group configuration based at least in part on a multi-TRP DMRS port group configuration index identified in the DCI.

9. The method of claim 1, wherein the first DMRS port group includes one or more first DMRS ports associated with the TRP; and
wherein the second DMRS port group includes one or more second DMRS ports associated with the other TRP.

10. The method of claim 9, wherein each DMRS port, of the one or more first DMRS ports, is associated with a respective downlink layer transmitted by the TRP.

11. The method of claim 1, wherein the downlink, of the wireless communication link between the UE and the TRP, comprises a plurality of downlink transmission layers; and
wherein performing the channel estimation for the downlink of the wireless communication link between the UE and the TRP comprises:
identifying the plurality of downlink transmission layers based at least in part on the multi-TRP DMRS port group configuration data structure, and
performing the channel estimation for each downlink transmission layer of the plurality of downlink transmission layers.

12. The method of claim 11, wherein each downlink transmission layer, of the plurality of downlink transmission layers, is associated with a respective DMRS port of the first DMRS port group.

13. A method of wireless communication performed by a transmit receive point (TRP), comprising:
assigning, to a first user equipment (UE), a first multi-TRP demodulation reference signal (DMRS) port group configuration, specified in a multi-TRP DMRS port group configuration data structure, that includes information identifying a plurality of multi-TRP DMRS port group configurations, including the first multi-TRP DMRS port group configuration, and a plurality of DMRS port groups, based at least in part on the first UE being configured to receive multi-TRP communications,
wherein the plurality of DMRS port groups include a first DMRS port group, associated with the TRP, and a second DRMS port group associated with another TRP; and
assigning, to a second UE, one of:
a second multi-TRP DMRS port group configuration of the plurality of multi-TRP DMRS port group configurations, or
a single-TRP DMRS port group configuration specified in a single-TRP DMRS port group configuration data structure.

14. The method of claim 13, wherein assigning one of the second multi-TRP DMRS port group configuration or the single-TRP DMRS port group configuration to the second UE comprises:
assigning one of the second multi-TRP DMRS port group configuration or the single-TRP DMRS port group configuration to the second UE based at least in part on:
a codeword configuration associated with the TRP,
a front-loaded OFDM symbol configuration associated with the TRP, or
a DMRS type associated with the TRP.

15. The method of claim 13, wherein assigning one of the second multi-TRP DMRS port group configuration or the single-TRP DMRS port group configuration to the second UE comprises:
assigning one of the second multi-TRP DMRS port group configuration or the single-TRP DMRS port group configuration to the second UE based at least in part on whether the second UE is configured to receive the multi-TRP communications or single-TRP communications.

16. The method of claim 13, wherein the first multi-TRP DMRS port group configuration and the second multi-TRP DMRS port group configuration are different multi-TRP DMRS port group configurations of the plurality of multi-TRP DMRS configurations.

17. A user equipment (UE) for wireless communication, comprising:
a memory; and
one or more processors coupled to the memory, the memory and the one or more processors configured to:
receive, from a transmit receive point (TRP), a downlink control information (DCI) that includes a transmission configuration indication (TCI) field;
determine that the TCI field specifies a quantity of two or more TCI states;

identify, based at least in part on the determining, a multi-TRP demodulation reference signal (DMRS) port group configuration included in a multi-TRP DMRS port group configuration data structure comprising information identifying the multi-TRP DMRS port group configuration and a plurality of DMRS port groups,
  wherein the plurality of DMRS port groups include a first DMRS port group, associated with the TRP, and a second DRMS port group associated with another TRP; and
perform, based at least in part on the first DMRS port group, a channel estimation for a downlink of a wireless communication link between the UE and the TRP.

18. The UE of claim 17, wherein the TCI field specifies a quantity of two TCI states that specify the plurality of DMRS port groups; and
  wherein the UE is communicatively connected to the other TRP.

19. The UE of claim 18, wherein the first DMRS port group is quasi-co-located with a first reference signal (RS) set associated with the TRP;
  wherein the second DMRS port group is quasi-co-located with a second RS set associated with the other TRP; and
  wherein one or more first DMRS ports, included in the first DMRS port group, and one or more second DMRS ports, included in the second DMRS port group, are not included in a same DMRS code division multiplexing (CDM) group.

20. The UE of claim 18, wherein the first DMRS port group is ordered before the second DMRS port group in the multi-TRP DMRS port group configuration; and
  wherein the second DMRS port group is ordered before the first DMRS port group in another multi-TRP DMRS port group configuration included in the multi-TRP DMRS port group configuration data structure.

21. The UE of claim 18, wherein the TCI field specifies an order of the first DMRS port group and the second DMRS port group in the multi-TRP DMRS port group configuration.

22. The UE of claim 17, wherein the one or more processors are further configured to:
  identify the multi-TRP DMRS port group configuration data structure based at least in part on determining that the TCI field specifies a quantity of two or more TCI states.

23. The UE of claim 17, wherein the one or more processors, when identifying the multi-TRP DMRS port group configuration, are configured to:
  identify the multi-TRP DMRS port group configuration based at least in part on a multi-TRP DMRS port group configuration index identified in the DCI.

24. The UE of claim 17, wherein the first DMRS port group includes one or more first DMRS ports associated with the TRP; and
  wherein the second DMRS port group includes one or more second DMRS ports associated with the other TRP.

25. The UE of claim 17, wherein the downlink, of the wireless communication link between the UE and the TRP, comprises a plurality of downlink transmission layers; and
  wherein the one or more processors, when performing the channel estimation for the downlink of the wireless communication link between the UE and the TRP are configured to:
    identify the plurality of downlink transmission layers based at least in part on the multi-TRP DMRS port group configuration data structure, and
    perform the channel estimation for each downlink transmission layer of the plurality of downlink transmission layers.

26. The UE of claim 25, wherein each downlink transmission layer, of the plurality of downlink transmission layers, is associated with a respective DMRS port of the first DMRS port group.

27. A transmit receive point (TRP) for wireless communication, comprising:
  a memory; and
  one or more processors coupled to the memory, the memory and the one or more processors configured to:
    assign, to a first user equipment (UE), a first multi-TRP demodulation reference signal (DMRS) port group configuration, specified in a multi-TRP DMRS port group configuration data structure, that includes information identifying a plurality of multi-TRP DMRS port group configurations, including the first multi-TRP DMRS port group configuration, and a plurality of DMRS port groups, based at least in part on the first UE being configured to receive multi-TRP communications,
      wherein the plurality of DMRS port groups include a first DMRS port group, associated with the TRP, and a second DRMS port group associated with another TRP; and
    assign, to a second UE, one of:
      a second multi-TRP DMRS port group configuration of the plurality of multi-TRP DMRS port group configurations, or
      a single-TRP DMRS port group configuration specified in a single-TRP DMRS port group configuration data structure.

28. The TRP of claim 27, wherein the one or more processors, when assigning one of the second multi-TRP DMRS port group configuration or the single-TRP DMRS port group configuration to the second UE, are configured to:
  assign one of the second multi-TRP DMRS port group configuration or the single-TRP DMRS port group configuration to the second UE based at least in part on:
    a codeword configuration associated with the TRP,
    a front-loaded OFDM symbol configuration associated with the TRP, or
    a DMRS type associated with the TRP.

29. The TRP of claim 27, wherein the one or more processors, when assigning one of the second multi-TRP DMRS port group configuration or the single-TRP DMRS port group configuration to the second UE, are configured to:
  assign one of the second multi-TRP DMRS port group configuration or the single-TRP DMRS port group configuration to the second UE based at least in part on whether the second UE is configured to receive the multi-TRP communications or single-TRP communications.

30. The TRP of claim 27, wherein the first multi-TRP DMRS port group configuration and the second multi-TRP DMRS port group configuration are different multi-TRP DMRS port group configurations of the plurality of multi-TRP DMRS port group configurations.

* * * * *